A. E. KING.
ARM REST.
APPLICATION FILED JULY 26, 1911.
1,019,658.
Patented Mar. 5, 1912.
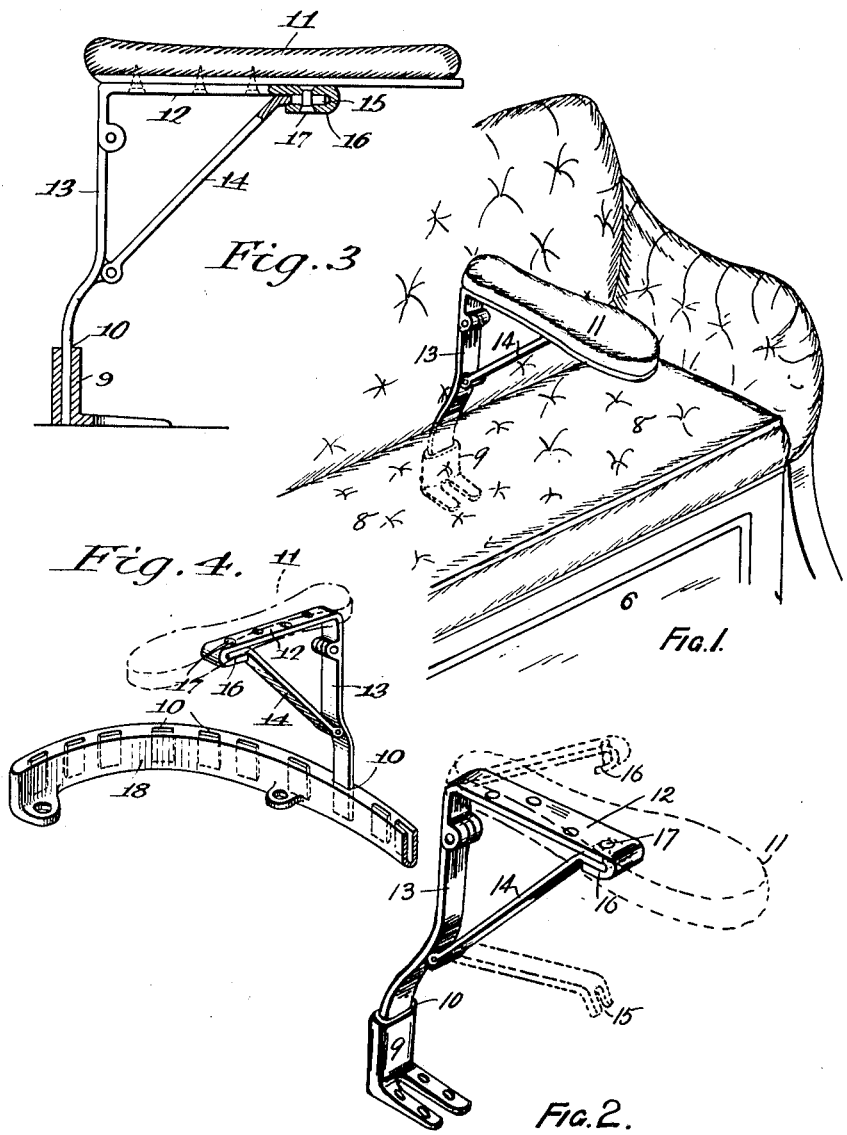

UNITED STATES PATENT OFFICE.

ALBERT EDWARD KING, OF ANNANDALE, NEAR SYDNEY, NEW SOUTH WALES, AUSTRALIA.

ARM-REST.

1,019,658.  Specification of Letters Patent.  Patented Mar. 5, 1912.

Application filed July 26, 1911. Serial No. 640,598.

*To all whom it may concern:*

Be it known that I, ALBERT EDWARD KING, a subject of the King of Great Britain, residing at 90 Booth street, Annandale, near Sydney, in the State of New South Wales, Commonwealth of Australia, have invented certain new and useful Improvements in Arm-Rests, of which the following is a specification.

This invention relates to an improved arm rest principally for use on the seats of motor cars, motor boats and railway and other passenger vehicles although it may also be adapted for use on lounges such as those in smoking and billiard rooms.

The object of my invention is to overcome the disadvantages of arm rests at present in use which are unsightly and interfere with the proper use of the seats when folded up.

The invention consists of a detachable and collapsible portion comprising the rest which is hinged at one end to a support which takes into a permanently fixed socket or other holder in the frame of the seat. About midway in said support is pivoted a lever or arm which when elevated to the proper angle permits of its free end engaging with a stop or fastening underneath the rest and maintains it securely in an approximately horizontal position. But in order that the invention may be readily comprehended, I will now refer to the drawings herewith, in which, Figure 1 is a perspective view of the invention as applied to a seat. Fig. 2 is an enlarged perspective view with the cushions and seat removed. Fig. 3 is a sectional elevation, while, Fig. 4 illustrates a perspective view of the invention applied to semi-circular or segmental seats.

The same numerals indicate the same or like parts throughout the drawings.

6 represents the seat of a motor car or other passenger vehicle preferably having the back squab 7 and seat cushion 8.

9 is a bracket which is permanently fixed to the seat or framework and 10 is a socket therein.

11 represents the rest preferably cushioned on its upper side and secured to the bar 12 which is hinged to the support 13. The support is preferably so curved as to conform to the shape of the back squab 7 or the back of the seat.

14 is a lever or arm hinged to the support 13 and provided with a forked end 15 which takes in the slot 16 formed integral with the bar 13 and is rigidly held by the stop 17.

Instead of the bar 12 the backing or foundation of the rest may be directly hinged to the support 13 in which case I secure to the backing a separate slot and stop for the end of the lever 14 to engage.

It will be evident that instead of having brackets secured at intervals to the seat I may provide a series of sockets 10 in a bracket 18 as shown in Fig. 4 and it is immaterial whether the seat is approximately semi-circular as shown or straight as for instance in a lounge.

My arm rest can be fixed or removed within a few seconds and may be folded into a small space when not required.

If necessary the support 13 may be locked in its socket.

Having thus described my invention what I claim as new and desire to protect by Letters Patent is:—

In an arm rest for seats, the combination with a lower bracket having a socket, a support having its lower end fitted in the said socket of the bracket, a bar hinged to the support and adapted to be disposed in horizontal position and having its outer end bent downwardly and inwardly to form a seat provided with a stop intersecting the same, and a brace bar hinged at an intermediate point to the support and having its free end normally bent to removably engage the said seat and stop.

In testimony whereof I have hereunto set my hand in presence of two subscribing witnesses.

ALBERT EDWARD KING.

Witnesses:
CHARLES E. GRAHAM,
HENRY W. CLARKE.